US010003251B2

(12) United States Patent
Wu et al.

(10) Patent No.: US 10,003,251 B2
(45) Date of Patent: Jun. 19, 2018

(54) POWER CONVERTING DEVICE CONTAINING HIGH FREQUENCY INVERTER AND LOW FREQUENCY INVERTER CONNECTING IN PARALLEL AND THE METHOD THEREOF

(71) Applicant: NATIONAL TSING HUA UNIVERSITY, Hsinchu (TW)

(72) Inventors: Tsai-Fu Wu, Hsinchu (TW); Yen-Hsiang Huang, Hsinchu (TW); Li-Chun Lin, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days. days.

(21) Appl. No.: 15/468,131

(22) Filed: Mar. 24, 2017

(65) Prior Publication Data
US 2018/0138805 A1    May 17, 2018

(30) Foreign Application Priority Data

Nov. 14, 2016   (TW) .............................. 105137118 A

(51) Int. Cl.
*H02M 1/00* (2006.01)
*H02M 7/42* (2006.01)
(Continued)

(52) U.S. Cl.
CPC ............ *H02M 1/143* (2013.01); *H02M 1/08* (2013.01); *H02M 7/537* (2013.01); *H02M 2001/0038* (2013.01)

(58) Field of Classification Search
CPC .... H02M 2001/007; H02M 7/42; H02M 7/44; H02M 2007/4822; H02M 7/537;
(Continued)

(56) References Cited

U.S. PATENT DOCUMENTS 5,914,572 A * 6/1999 Qian ..................... H05B 41/28
                                                        315/209 R
6,005,788 A * 12/1999 Lipo ....................... H02M 7/49
                                                        363/71
(Continued)

FOREIGN PATENT DOCUMENTS

TW            I524648 B      3/2016

OTHER PUBLICATIONS

S. Bernet, "Recent developments of high power converters for industry and traction applications", IEEE Transactions on Power Electronics, published in Nov. 2000, vol. 15, issue 6, pp. 1-14, published by IEEE Power Electronics Society, United States.
(Continued)

*Primary Examiner* — Timothy J Dole
*Assistant Examiner* — Sisay G Tiku
(74) *Attorney, Agent, or Firm* — CKC & Partners Co., Ltd.

(57) ABSTRACT

A power converting method for high frequency inverter and low frequency inverter connecting in parallel, which is for converting a direct current power into an alternating current power, includes the following steps. A low frequency inverting module which electrically connected to the direct current power is provided. A high frequency inverting module which is electrically connected to the low frequency inverting module in parallel is provided. A high frequency switching duty ratio of the high frequency inverting module is adjusted to output a second current according to a first current produced by the low frequency inverting module. The second current is for compensating ripples of the first current.

13 Claims, 17 Drawing Sheets

(51) Int. Cl.
*H02M 7/44* (2006.01)
*H02M 7/493* (2007.01)
*H02M 7/497* (2007.01)
*H02M 1/14* (2006.01)
*H02M 1/08* (2006.01)
*H02M 7/537* (2006.01)

(58) Field of Classification Search
CPC ...... H02M 7/493; H02M 7/497; H02M 7/501; H02M 1/14; H02M 1/143
See application file for complete search history.

(56) References Cited

U.S. PATENT DOCUMENTS

| | | | | |
|---|---|---|---|---|
| 9,641,099 | B2* | 5/2017 | Gupta | H02M 7/493 |
| 2009/0021081 | A1* | 1/2009 | Jacobson | H02M 1/42 |
| | | | | 307/77 |
| 2011/0089765 | A1* | 4/2011 | Iwata | H02M 7/49 |
| | | | | 307/82 |
| 2013/0201733 | A1* | 8/2013 | Divan | H02M 1/00 |
| | | | | 363/39 |
| 2014/0307489 | A1* | 10/2014 | Kidera | H02M 7/487 |
| | | | | 363/40 |
| 2015/0214832 | A1* | 7/2015 | Tang | H02M 1/14 |
| | | | | 363/40 |
| 2015/0303830 | A1* | 10/2015 | Kang | H02M 7/5395 |
| | | | | 363/71 |
| 2017/0133947 | A1* | 5/2017 | Fu | H02M 7/487 |

OTHER PUBLICATIONS

Jih-Sheng Lai et al., "Multilevel Converters—A New Breed of Power Converters", IEEE Transactions on Industry Applications, published in May/Jun. 1996, vol. 32, issue 3, pp. 509-517, published by IEEE Industry Applications Society, United States.

Ehsan Behrouzian et al., "An overview of multilevel converter topologies for grid connected applications", 2013 15th European Conference on Power Electronics and Applications, dated on Sep. 2-6, 2013, 10 pages, France.

Samir Kouro et al., "Recent Advances and Industrial Applications of Multilevel Converters", IEEE Transactions on Industrial Electronics, published in Aug. 2010, vol. 57, issue 8, 29 pages, published by IEEE Industrial Electronics Society, United States.

Andreas Schönknecht et al., "Novel Topology for Parallel Connection of Soft-Switching High-Power High-Frequency Inverters", IEEE Transactions on Industry Applications, published in Mar./Apr. 2003, vol. 39, issue 2, pp. 550-555, published by IEEE Industry Applications Society, United States.

L. Matakas Jr. et al., "High Power, High Performance Parallel Connected Multiconverters Analysis and Control", 1995 Proceedings of the IEEE International Symposium on Industrial Electronics, dated on Jul. 10-14, 1995, pp. 121-126, Greece.

Hong-Je Ryoo et al., "Unit Power Factor Operation of Parallel Operated Ac to Dc PWM Converter for High Power Traction Application", 2001 IEEE 32nd Annual Power Electronics Specialists Conference, dated on Jun. 17-21, 2001, vol. 2, pp. 631-636, Canada.

Gerard Ledwich et al., "Multiple Converter Performance and Active Filtering", IEEE Transactions on Power Electronics, published in May 1995, vol. 10, issue 3, pp. 273-279, published by IEEE Power Electronics Society, United States.

L. Asiminoaei et al., "An Interleaved Active Power Filter with Reduced Size of Passive Components", Twenty-First Annual IEEE Applied Power Electronics Conference and Exposition, dated on Mar. 19-23, 2006, pp. 969-976, United States.

Xiongfei Wang et al., "An Active Damper for Stabilizing Power-Electronics-Based AC Systems", IEEE Transactions on Power Electronics, published in Jul. 2014, vol. 29, issue 7, pp. 3318-3329, published by IEEE Power Electronics Society, United States.

Xiongfei Wang et al., "An Active Damper to Suppress Multiple Resonances with Unknown Frequencies", Twenty-ninth Annual IEEE Applied Power Electronics Conference and Exposition, dated on Mar. 16-20, 2014, 8 pages, United States.

Diane Leblanc et al., "Stability analysis and active stabilization by a centralized stabilizer of Voltage-Source-Rectifier Loads in AC microgrids", 2013 IEEE Industry Applications Society Annual Meeting, dated on Oct. 6-11, 2013, pp. 1-8, United States.

Tsai-Fu Wu et al., "Predictive Current Controlled 5-kW Single-Phase Bidirectional Inverter With Wide Inductance Variation for DC-Microgrid Applications", IEEE Transactions on Power Electronics, published in Dec. 2010, vol. 25, issue 12, pp. 3076-3084, published by IEEE Power Electronics Society, United States.

Tsai-Fu Wu et al., "A D-Σ Digital Control for Three-Phase Inverter to Achieve Active and Reactive Power Injection", IEEE Transactions on Industrial Electronics, published in Aug. 2014, vol. 61, issue 8, pp. 3879-3890, published by IEEE Industrial Electronics Society, United States.

Tsai-Fu Wu et al., "Extended Application of D-Σ Digital Control to a Single-Phase Bidirectional Inverter With an LCL Filter", IEEE Transactions on Power Electronics, published in Jul. 2015, vol. 30, issue 7, pp. 3903-3911, published by IEEE Power Electronics Society, United States.

Aleksandr Reznik et al., "LCL Filter Design and Performance Analysis for Grid-Interconnected Systems", IEEE Transactions on Industry Applications, published in Mar.-Apr. 2014, vol. 50, issue 2, pp. 1225-1232, published by IEEE Industry Applications Society, United States.

\* cited by examiner

POWER CONVERTING DEVICE CONTAINING HIGH FREQUENCY INVERTER AND LOW FREQUENCY INVERTER CONNECTING IN PARALLEL AND THE METHOD THEREOF

RELATED APPLICATIONS

This application claims priority to Taiwan Application Serial Number 105137118, filed Nov. 14, 2016, which is herein incorporated by reference.

BACKGROUND

Technical Field

The present disclosure relates to a power converting device and a method. More particularly, the present disclosure relates to a power converting device containing high frequency inverter and low frequency inverter connecting in parallel and the method thereof.

Description of Related Art

Recently, the growing attention of the environmental cost of fossil energy and nuclear energy results in a rapid development of renewable energies and distributed generations. In order to make the distributed generations to stably supply power, the renewable energy converting device is connected to an electrical grid in parallel to make sure that the quality of power can be maintained while the renewable energy is running out. On the other hand, the surplus power can be sent back to the electrical grid to earn some profit.

However, due to the instability of the renewable energy and the non-linear switching operation of the electronic equipment, the distributed generation introduces harmonics and ripples into the electrical grid; thus the controlling cost of the power system as well as the hardware cost for compensating virtual work will be increased. Accordingly, compensating the ripples and the harmonics is adapted as a method to improve the electric quality. Besides, considering the maximum power point tracking and the application of load fluctuation, the total performance of the power system will be limited by the dynamical response of the load fluctuation. Therefore, through improving the system dynamical response, the efficiency can be improved, and the distortion as well as the miss operation can be reduced.

Owing to the improvement of the power of the inverters, a high-frequency LC filter, a hybrid active filter, or a parallel interleaved inverter is used to reduce the ripples and to increase the dynamical response. In the grid-connected inverter system, the high-frequency LC filter can form a short closed circuit in a specific frequency through the resonance, which can prevent the ripples from introduced into the electrical grid, but the resonance frequency and the stable period is not easy to be decided. The active power filter and the hybrid active filter can detect the virtual work and the harmonics to calculate the switching duty ratio. Although the dynamic response and the virtual work can be compensated, the ripples still exist. The parallel interleaved inverter can improve the dynamic response and decrease the ripples, but the ripples elimination is limited by the parallel number. The common disadvantage of the above mentioned system is that the size of the iron core of the inductor as well as the inductance needs to be increased in order to remove the ripples. Besides, the inductance of the inductor will decrease along with the increase of the current, as a result, the real size of the iron core and the inductance should be larger than the theoretic value in order to reserve the decay range of the inductance. Therefore, the dynamic response will decrease if the inductance increase.

Because the cost of the high-power and high-speed switching elements is high, low-speed switching elements are adapted in the high-power inverter in order to reduce the cost. As a result, the dynamic response is limited by the maximum switching frequency of the switching elements. Moreover, even if the inductance of the filter is the same, the ripples will increase if the switching frequency of the switching elements is lower. Hence, the requirement of the inductance of the inductor and the corresponding cost, size and weight are higher.

Therefore, how to efficiently reduce the ripples and cost becomes a pursuit target for practitioners.

SUMMARY

A power converting method for high frequency inverter and low frequency inverter connecting in parallel, which is for converting a direct current power into an alternating current power, includes the following steps. A low frequency inverting module which electrically connected to the direct current power is provided. A high frequency inverting module which is electrically connected to the low frequency inverting module in parallel is provided. A high frequency switching duty ratio of the high frequency inverting module is adjusted to output a second current according to a first current produced by the low frequency inverting module. The second current is for compensating ripples of the first current.

A power converting method for high frequency inverter and low frequency inverter connecting in parallel, which is for converting a direct current power into an alternating current power, includes the following steps. A low frequency inverting module which is electrically connected to the direct current power is provided. A high frequency inverting module which is electrically connected to the low frequency inverting module in parallel is provided. At least one of the low frequency inverting module and the high frequency inverting module is selectively enabled according to a fluctuation of a load. When the high frequency inverting module and the low frequency inverting module are both enabled, the high frequency inverting module outputs a second current according to a first current produced by the low frequency inverting module, and the second current is for compensating ripples of the first current.

A power converting device containing high frequency inverter and low frequency inverter connecting in parallel, which is applied to the power converting method described above, includes the low frequency inverting module, the high frequency inverting module and a controlling module. The low frequency inverting module includes a first input end and a first output end. The first input end is electrically connected to the direct current power and the first output end is for outputting a first current. The high frequency inverting module includes a second input end and a second output end. The second input end is electrically connected to the direct current power, and the second output end is electrically connected to the first output end and is for outputting a second current. The controlling module is electrically connected to the low frequency inverting module and the high frequency inverting module, and the controlling module is for adjusting the high switching duty ratio to allow the second current to compensate the ripples of the first current.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
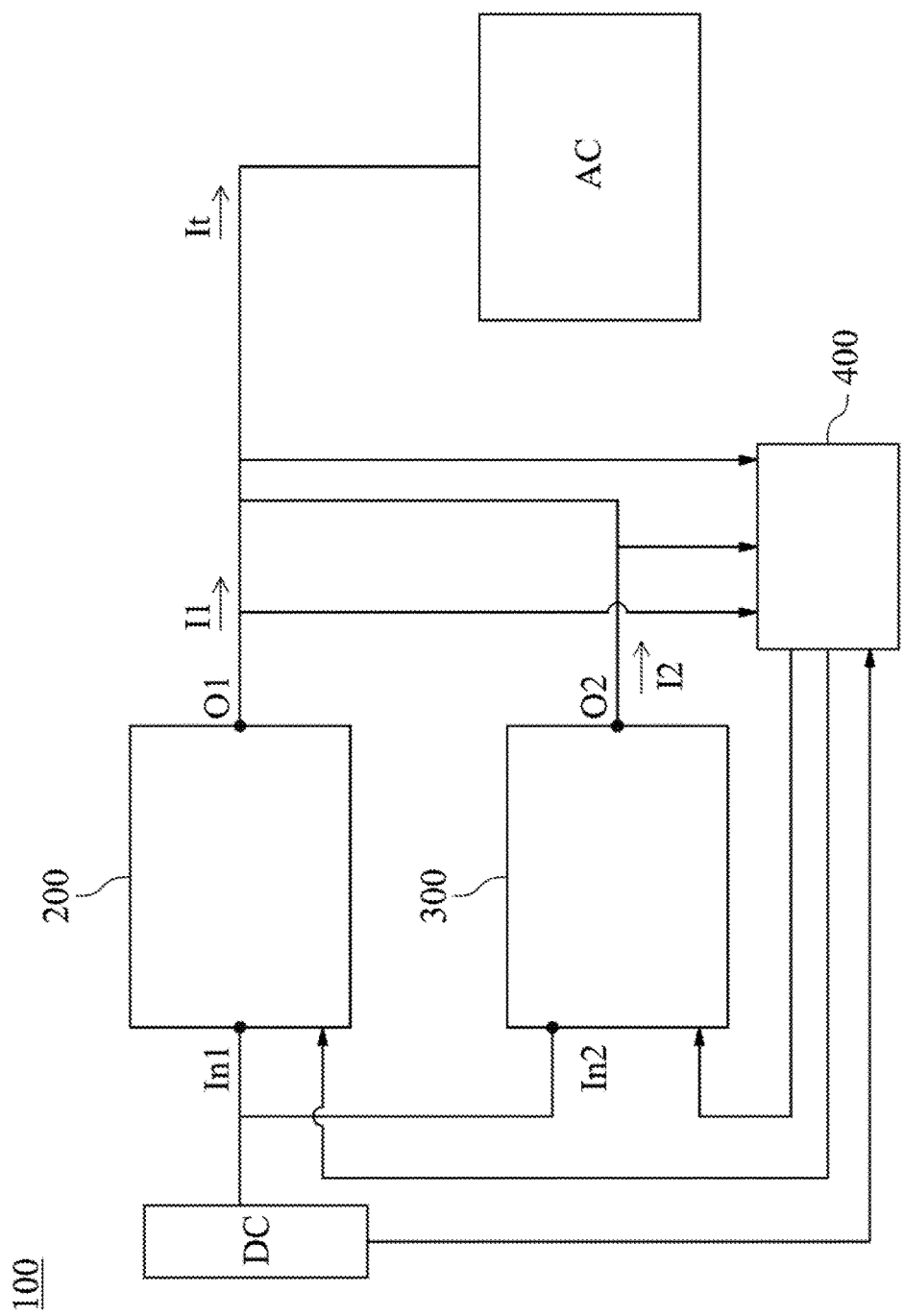
FIG. 1 is a schematic block diagram showing a power converting device containing high frequency inverter and low frequency inverter connecting in parallel according to one embodiment of the present disclosure.
Figure 2:
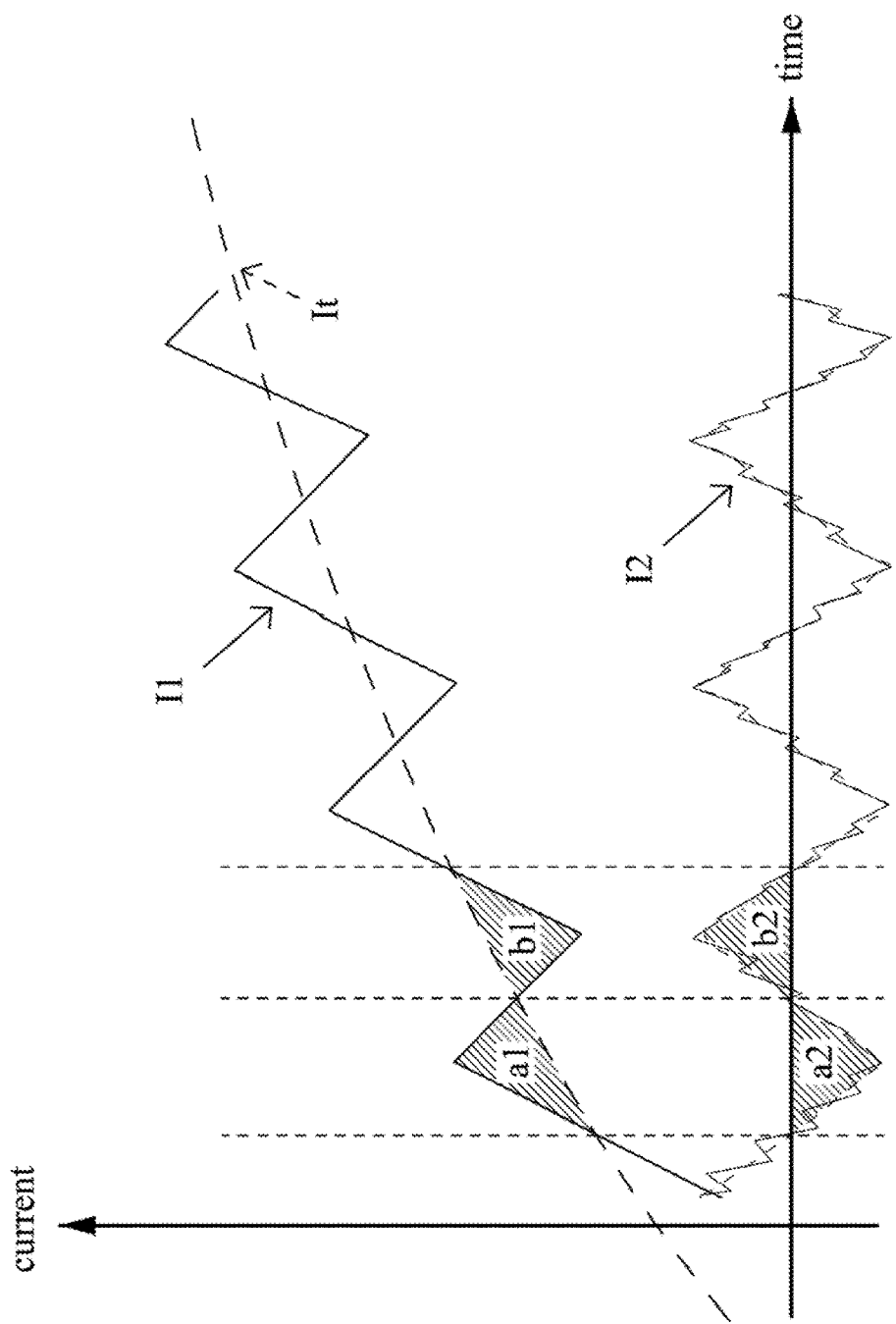
FIG. 2 is a schematic diagram showing the current compensation of the power converting device of FIG. 1.
Figure 3:
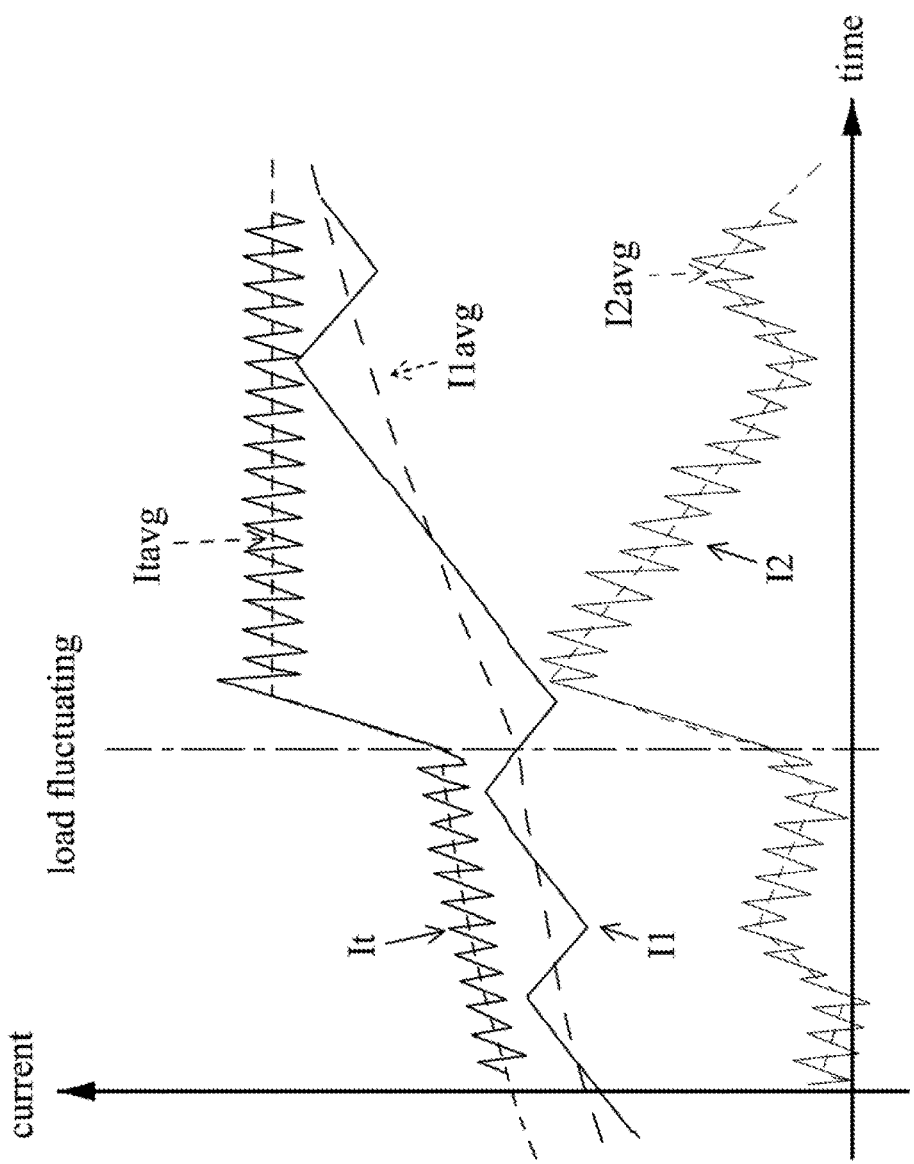
FIG. 3 is another schematic diagram showing the current compensation of the power converting device of FIG. 1.

Please refer to FIG. 1, FIG. 2 and FIG. 3. FIG. 1 is a schematic block diagram showing a power converting device 100 containing high frequency inverter and low frequency inverter connecting in parallel according to one embodiment of the present disclosure. FIG. 2 is a schematic diagram showing the current compensation of the power converting device 100 of FIG. 1. FIG. 3 is another schematic diagram showing the current compensation of the power converting device 100 of FIG. 1.

The power converting device 100, which is for converting a direct current power DC to an alternating current power AC, includes a low frequency inverting module 200, a high frequency inverting module 300 and a controlling module 400. The low frequency inverting module 200 includes a first input end In1 and a first output end O1. The first input end In1 is electrically connected to the direct current power DC and the first output end O1 is for outputting a first current I1. The high frequency inverting module 300 includes a second input end In2 and a second output end O2. The second input end In2 is electrically connected to the direct current power DC, and the second output end O2 is electrically connected to the first output end O1 and is for outputting a second current I2. The controlling module 400 is electrically connected to the low frequency inverting module 200 and the high frequency inverting module 300, and the controlling module 400 is for adjusting a high switching duty ratio of the high frequency inverting module 300 to allow the second current I2 to compensate the ripples of the first current I1.

The low frequency inverting module 200 is controlled by pulse width modulation signals such that the first current I1 outputting therefrom is a sine wave. However, as shown in FIG. 2, ripples, such as ripples a1, b11 are easily occurred during current translation. In the present disclosure, the high switching duty ratio of the high frequency inverting module 300 can be adjusted by controlling the high frequency inverting module 300 with the pulse width modulation signals, and then the second current I2 can include compensating waves a2, b2 that correspond to the ripples a1, b1, respectively. Therefore, the ripples of the first current I1 can be compensated by the second current I2, and the total output current It becomes a smooth sine wave.

As shown in FIG. 3, the dynamical response of the power converting device 100 is better. Through the high fluctuating ratio of the second current I2, the first current I1 of the low frequency inverting module 200 can be compensated. Consequently, the dynamic response of the total output current It can be improved. In FIG. 3, Itavg presents the average of the total output current It, I1avg presents the average of the first current I1, and the I2avg presents average of the second current I2.

Figure 4:
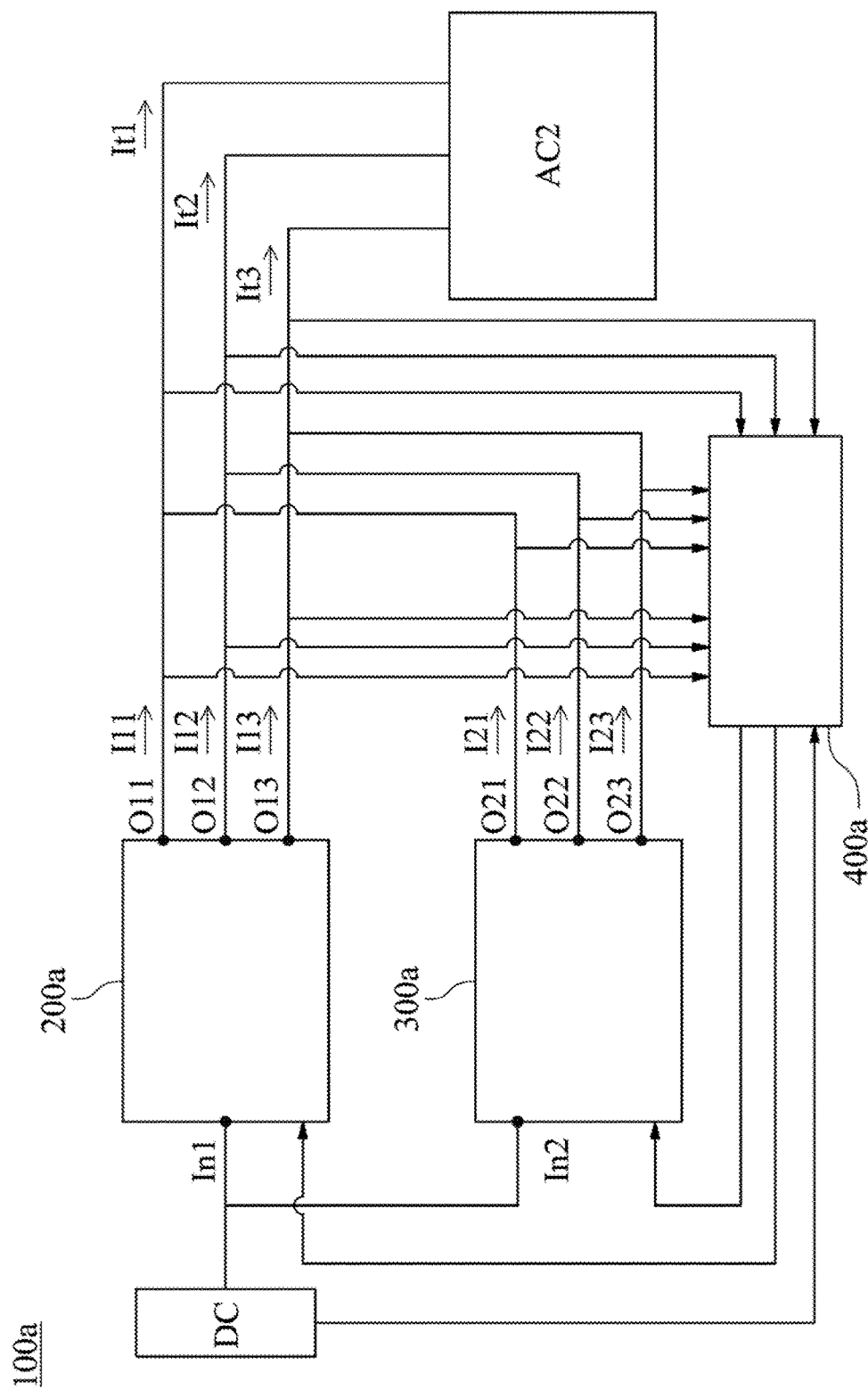
FIG. 4 is a schematic block diagram showing a power converting device containing high frequency inverter and low frequency inverter connecting in parallel according to another embodiment of the present disclosure.
Figure 5:
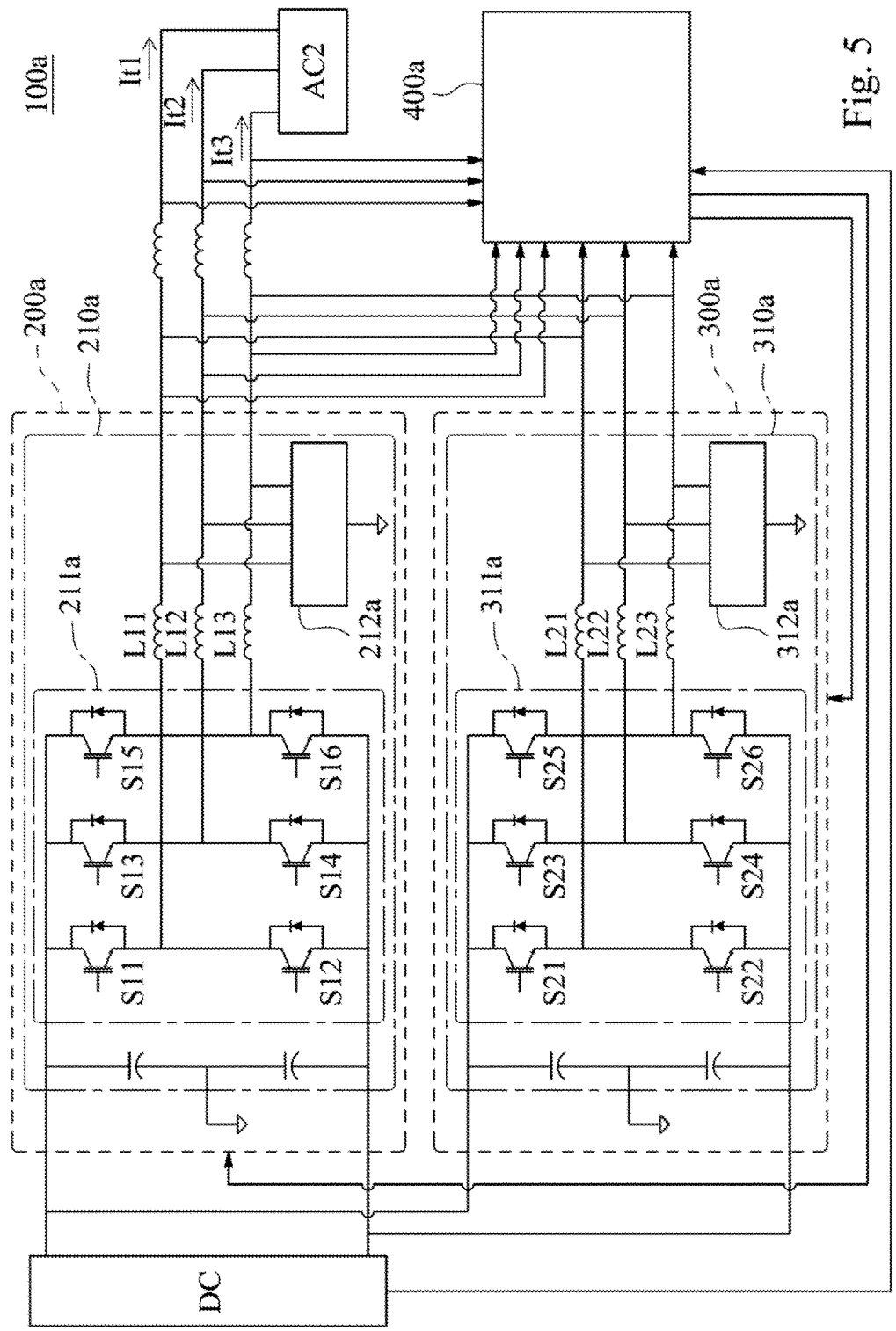
FIG. 5 is a schematic circuit diagram of the power converting device of FIG. 4.

Please refer to FIG. 4 and FIG. 5. FIG. 4 is a schematic block diagram showing a power converting device 100a containing high frequency inverter and low frequency inverter connecting in parallel according to another embodiment of the present disclosure. FIG. 5 is a schematic circuit diagram of the power converting device 100a of FIG. 4.

The block diagram of the power converting device 100a is similar to the power converting device 100 of FIG. 1, but the power converting device 100a is used for converting the direct current power DC into three-phase alternating current power AC2. Hence, the first output end (not labeled) of the low frequency inverting module 200a can include a first R-phase output point O11, a first S-phase output point O12 and a first T-phase output point O13. The first R-phase output point O11 is for outputting a first R-phase current I11, the first S-phase output point O12 is for outputting a first S-phase current I12, and the first T-phase output point O13 is for outputting a first T-phase current I13. The first R-phase current I11, the first S-phase current I12 and the first T-phase current I13 combine as the first current.

The second output end (not labeled) of the high frequency inverting module 300a can include a second R-phase output point O21, a second S-phase output point O22 and a second T-phase output point O23. The second R-phase output point O21 is for outputting a second R-phase current I21, the second S-phase output point O22 is for outputting a second S-phase current I22, and the second T-phase output point O23 is for outputting a second T-phase current I23. The second R-phase current I21, the second S-phase current I22 and the second T-phase current I23 combine as the second current. The second R-phase output point O21 is electrically connected to the first R-phase output point O11 in order to compensate the first R-phase current I11 with the second R-phase current I21. The second S-phase output point O22 is electrically connected to the first S-phase output point O12 in order to compensate the first S-phase current I12 with the second S-phase current I22. The second T-phase output point O23 is electrically connected to the first T-phase output point O13 in order to compensate the first T-phase current I13 with the second T-phase current I23. Therefore, the ripples can be compensated, and the total output R-phase current It1, the total output S-phase current It2 and the total output T-phase current It3 can have smooth waveform and less ripples.

To be more specific, the low frequency inverting module 200a can include a low frequency inverting unit 210a, and the low frequency inverting unit 210a can include a three-phase half-bridge inverter 211a and a low frequency filter 212a. The low frequency filter 212a is electrically connected to the half-bridge inverter 211a. The three-phase half-bridge inverter 211a includes a plurality of switch elements S11, S12, S13, S14, S15, S16 that can be opened or closed by pulse width modulation signals, which is a well-known technique and will not be described in detail. In the embodiment, the three-phase half-bridge inverter 211a is operated in low switching frequency. In other words, the switch elements S11, S12, S13, S14, S15, S16 are closed or opened in low frequency.

The high frequency inverting module 300a can include a high frequency inverting unit 310a, and the high frequency inverting unit 310a can include another three-phase half-bridge inverter 311a and a high frequency filter 312a. The high frequency filter 312a is electrically connected to the half-bridge inverter 311a. The three-phase half-bridge inverter 311a includes a plurality of switch elements S21, S22, S23, S24, S25, S26 that can be opened or closed by pulse width modulation signals. In the embodiment, the three-phase half-bridge inverter 311a is operated in high switching frequency. In other words, the switch elements S21, S22, S23, S24, S25, S26 are closed or opened in high frequency. Preferably, the low switching frequency is eight times the high switching frequency. Besides, the three-phase half-bridge inverter 211a can be electrically connected to a first R-phase inductor L11, a first S-phase inductor L12, and a first T-phase inductor L13, and the three-phase half-bridge inverter 311a can be electrically connected to a second R-phase inductor L21, a second S-phase inductor L22, and a second T-phase inductor L23. The power of the low frequency inverting module 200a is larger than that of the high frequency inverting module 300a.

The controlling module 400a receives the current feedback, including the first R-phase current I11, the first S-phase current I12, the first T-phase current I13, the second R-phase current I21, the second S-phase current I22, the second T-phase current I23, the total output R-phase current It1, the total output S-phase current It2 and the total output T-phase current It3, and the voltage feedback of the direct current power DC to adjust a low switching duty ratio of the low frequency inverting module 200a and the high switching duty ratio of the high frequency inverting module 300a.

In the embodiment, calculations of the low switching duty ratio are shown as equations (1) to (3) below, and calculations of the high switching duty ratio are shown as equations (4) to (6) below.

$$d_{R,low}(n) = \frac{\Delta I_{R,low}(n)}{T_{s,low}} \frac{L_{R,low}(n)}{V_{dc}} + \frac{V_{RN}(n)}{V_{dc}} + \frac{1}{2}; \tag{1}$$

$$d_{S,low}(n) = \frac{\Delta I_{S,low}(n)}{T_{s,low}} \frac{L_{S,low}(n)}{V_{dc}} + \frac{V_{SN}(n)}{V_{dc}} + \frac{1}{2}; \tag{2}$$

$$d_{T,low}(n) = \frac{\Delta I_{T,low}(n)}{T_{s,low}} \frac{L_{T,low}(n)}{V_{dc}} + \frac{V_{TN}(n)}{V_{dc}} + \frac{1}{2}; \tag{3}$$

$$d_{R,high}(n) = \frac{\Delta I_{R,total}(n)}{T_{s,high}} \frac{L_{R,high}(n)}{V_{dc}} + \frac{V_{RN}(n)}{V_{dc}} + \frac{1}{2}; \tag{4}$$

$$d_{S,high}(n) = \frac{\Delta I_{S,total}(n)}{T_{s,high}} \frac{L_{S,high}(n)}{V_{dc}} + \frac{V_{SN}(n)}{V_{dc}} + \frac{1}{2}; \text{ and} \tag{5}$$

$$d_{T,high}(n) = \frac{\Delta I_{T,total}(n)}{T_{s,high}} \frac{L_{T,high}(n)}{V_{dc}} + \frac{V_{TN}(n)}{V_{dc}} + \frac{1}{2}. \tag{6}$$

$\Delta I_{R,low}(n)$, $\Delta I_{S,low}(n)$, $\Delta I_{T,low}(n)$, $\Delta I_{R,total}(n)$, $\Delta I_{S,total}(n)$ and $\Delta I_{T,total}(n)$ are shown as equations (7) to (12) below.

$$\Delta I_{R,low}(n) = I_{Rlow,ref}(n) - I_{R,low}(n) \tag{7}$$

$$\Delta I_{S,low}(n) = I_{Slow,ref}(n) - I_{S,low}(n) \tag{8}$$

$$\Delta I_{T,low}(n) = I_{Tlow,ref}(n) - I_{T,low}(n) \tag{9};$$

$$\Delta I_{R,total}(n) = I_{R,low}(n) - I_{Rlow,ref}(n) + I_{Rhigh,ref}(n) - I_{R,high}(n) \tag{10}:$$

$$\Delta I_{S,total}(n) = I_{S,low}(n) - I_{Slow,ref}(n) + I_{Shigh,ref}(n) - I_{S,high}(n) \tag{11}; \text{ and}$$

$$\Delta I_{T,total}(n) = I_{T,low}(n) - I_{Tlow,ref}(n) + I_{Thigh,ref}(n) - I_{T,high}(n) \tag{12}.$$

Wherein $d_{R,low}(n)$ presents the low switching duty ratio of the switching elements S11, S12. $d_{S,low}(n)$ presents the low switching duty ratio of the switching elements S13, S14. $d_{T,low}(n)$ presents the low switching duty ratio of the switching elements S15, S16. $d_{R,high}(n)$ presents the high switching duty ratio of the switching elements S21, S22. $d_{S,high}(n)$ presents the high switching duty ratio of the switching elements S23, S24. $d_{T,high}(n)$ presents the high switching duty ratio of the switching elements S25, S26. $V_{RN}$, $V_{SN}$ and $V_{TN}$ present the R-phase voltage, the S-phase voltage and the T-phase voltage of the alternating current power AC2, respectively. $I_{R,low}$, $I_{S,low}$ and $I_{T,low}$ present the current value of the first R-phase current I11, the current value of the first S-phase current I12 and the current value of the first T-phase current I13, respectively. $L_{R,low}$, $L_{S,low}$ and $L_{T,low}$ present the inductance value of the first R-phase inductor L11, the inductance value of the first S-phase inductor L12 and the inductance value of the first T-phase inductor L13, respectively. $L_{R,high}$, $L_{S,high}$ and $L_{T,high}$ present the inductance value of the second R-phase inductor L21, the inductance value of the second S-phase inductor L22 and the inductance value of the second T-phase inductor L23, respectively. $V_{dc}$ present the voltage value of the direct current power DC. $I_{Rlow,ref}(n)$, $I_{Slow,ref}(n)$ and $I_{Tlow,ref}(n)$ present three-phase current reference of the low frequency inverting module 200a, respectively. $I_{Rhigh,ref}(n)$, $I_{Shigh,ref}(n)$ and $I_{Thigh,ref}(n)$ present the three-phase current reference of the high frequency inverting module 300a. $T_{s,low}$ presents the switching period of the switching elements S11, S12, S13, S14, S15, S16 of the low frequency inverting module 200a. $T_{s,high}$ presents the switching period of the switching elements S21, S22, S23, S24, S25, S26 of the high frequency inverting module 300a.

Therefore, through the feedbacks and the calculations, the controlling module 400a can adjust the high switching duty ratio of the switching elements S21, S22, S23, S24, S25, S26 of the high frequency inverting module 300a according to the first R-phase current I11, the first S-phase current I12 and the first T-phase current I13, respectively, so as to reduce the ripples pf the first R-phase current I11, the first S-phase current I12 and the first T-phase current I13.

Figure 6:
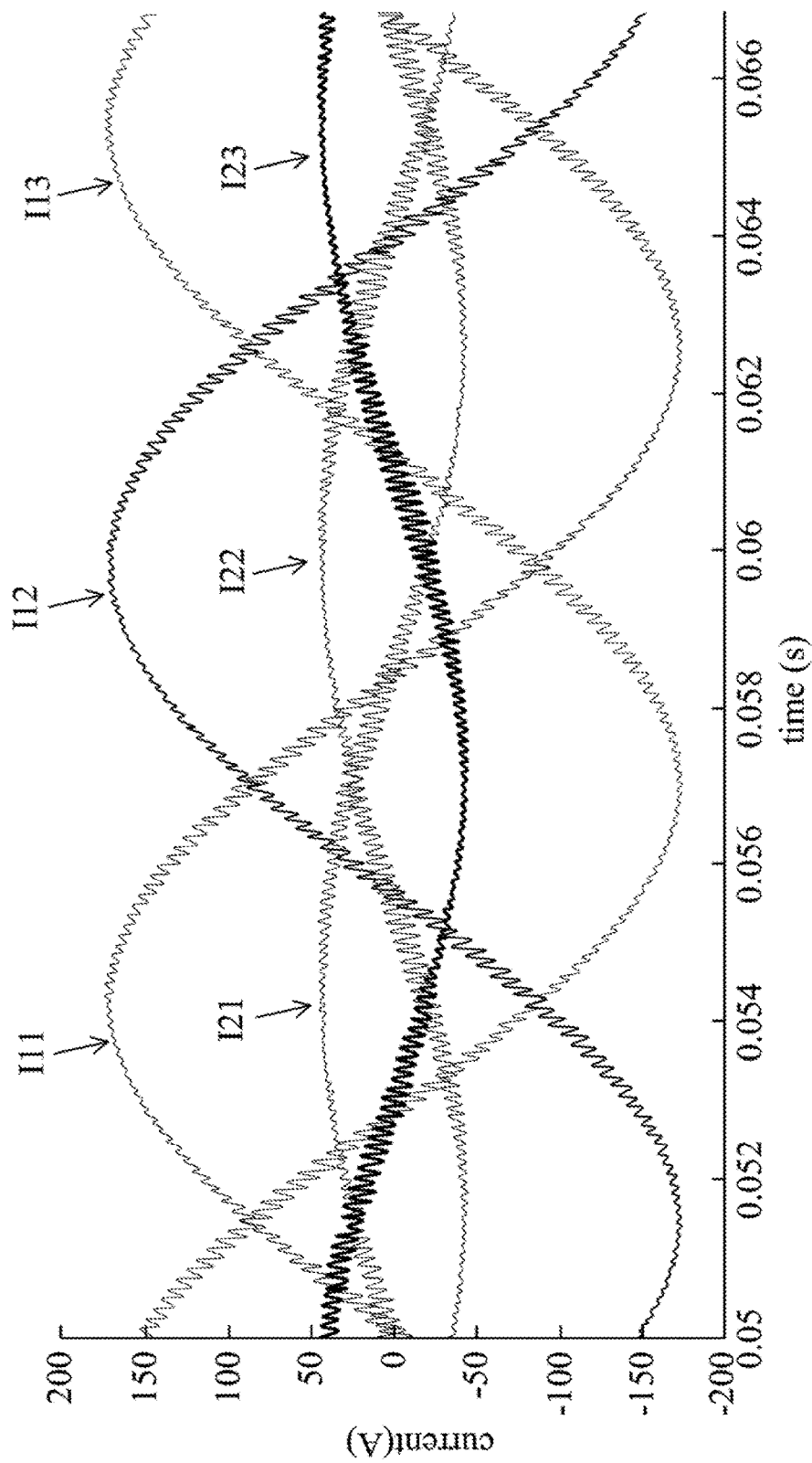
FIG. 6 is a schematic chart showing the relationship between a current and time of the power converting device of FIG. 4.
Figure 7:
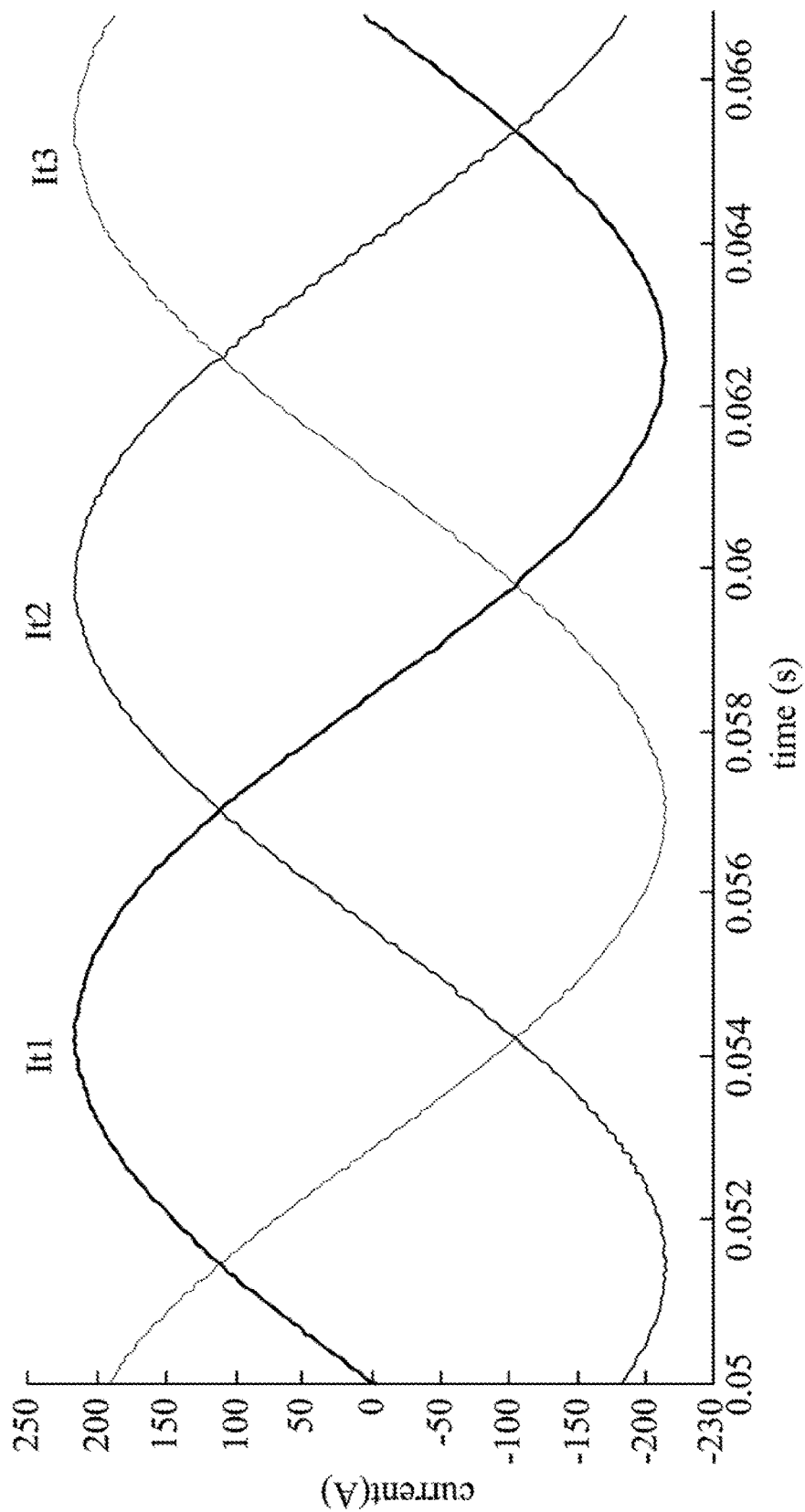
FIG. 7 is another schematic chart showing the relationship between a current and time of the power converting device of FIG. 4.

Please refer to FIG. 6 and FIG. 7. FIG. 6 is a schematic chart showing the relationship between a current and time of the power converting device 100a of FIG. 4. FIG. 7 is another schematic chart showing the relationship between a current and time of the power converting device 100a of FIG. 4. As shown in FIG. 6, each of the first R-phase current I11, the first S-phase current I12 and the first T-phase current I13 has obvious ripples, and the largest ripple is 10% the peak current. Through the compensation of the second R-phase current I21, the second S-phase current I22 and the second T-phase current I23, the largest ripple of the total output R-phase current It1, the total output S-phase current It2 and the total output T-phase current It3 is declined to 0.464% the peak current.

Figure 8:
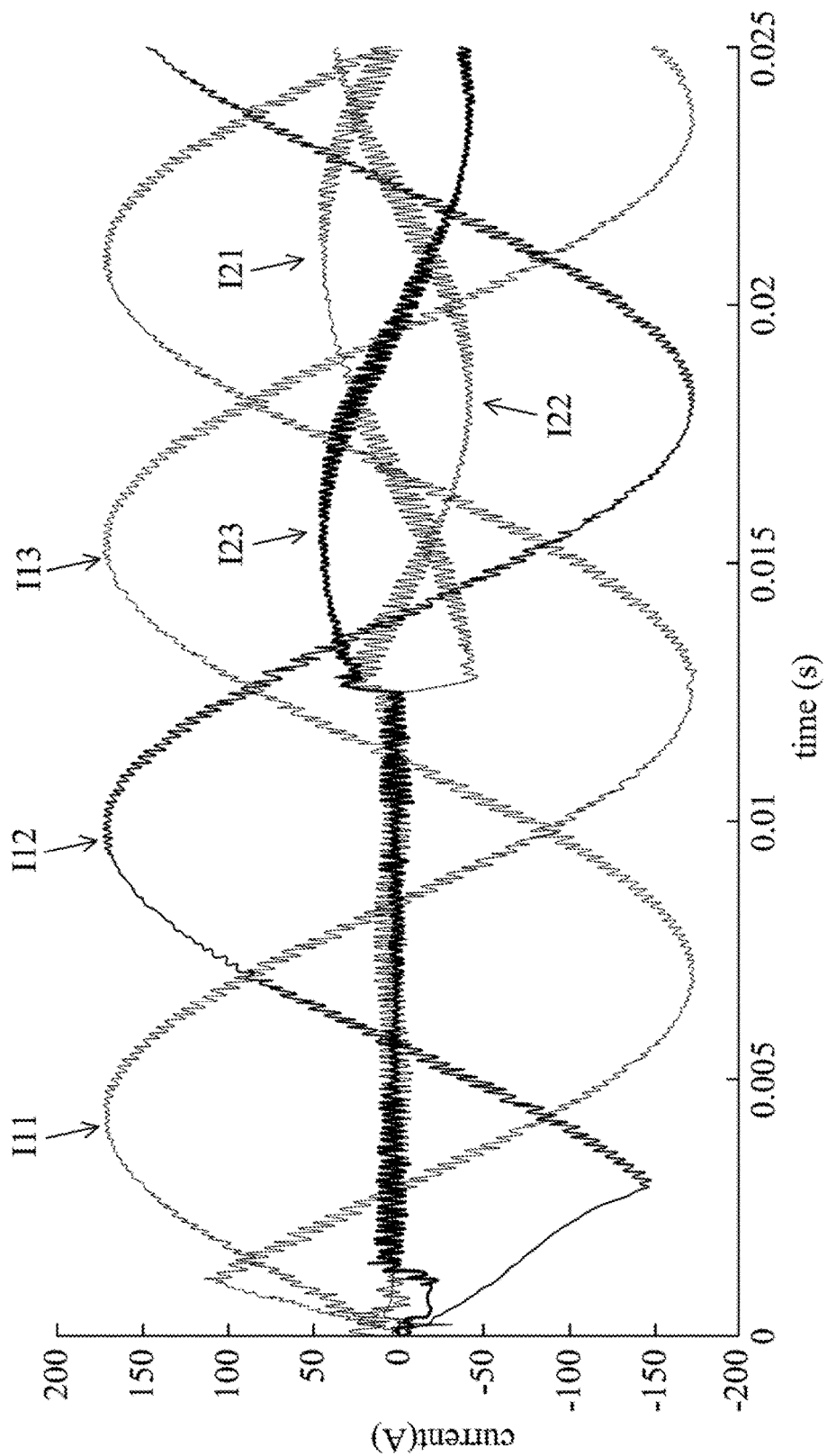
FIG. 8 is a further schematic chart showing the relationship between a current and time of the power converting device of FIG. 4.
Figure 9:
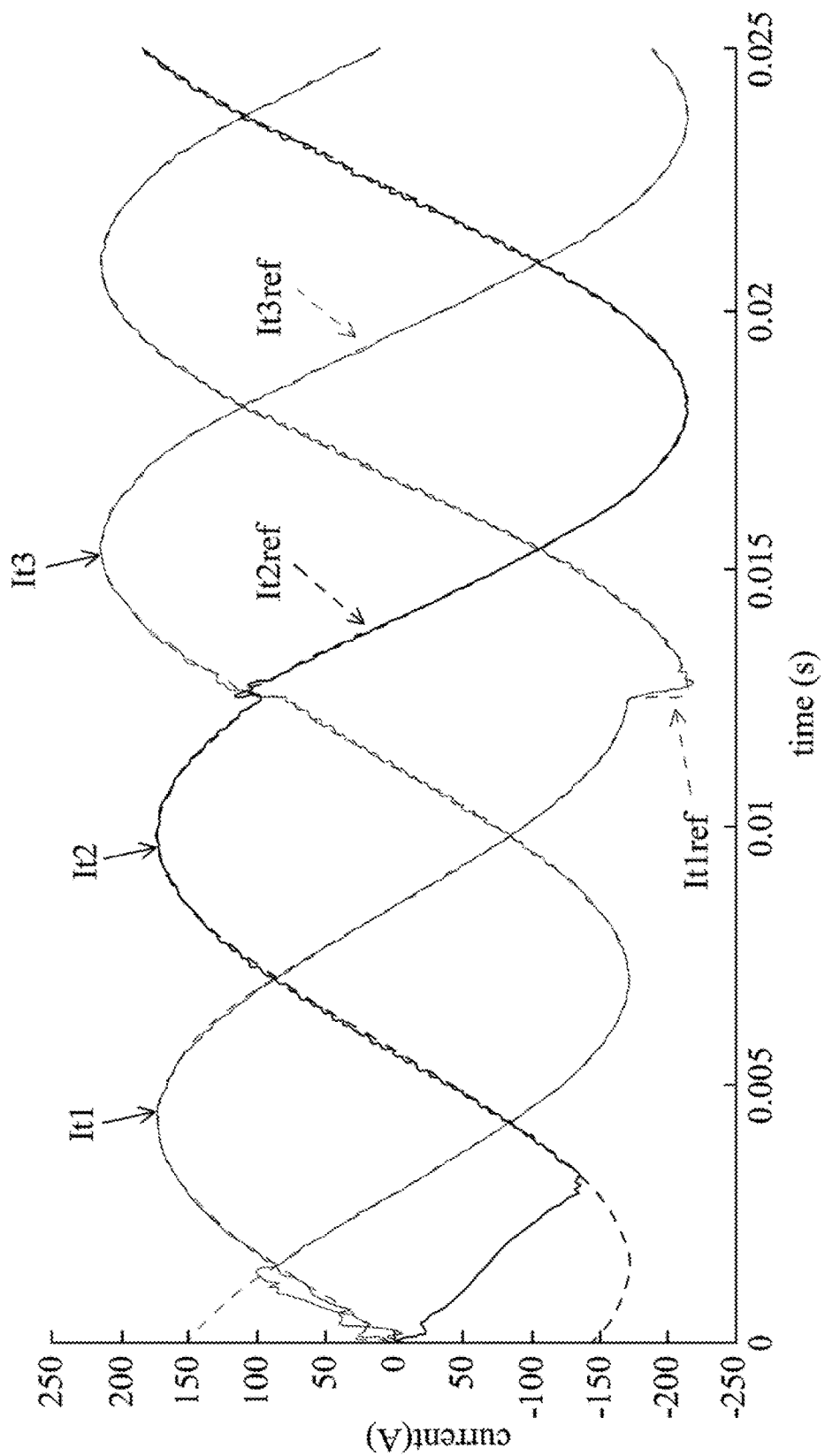
FIG. 9 is yet another schematic chart showing the relationship between a current and time of the power converting device of FIG. 4.
Figure 10:
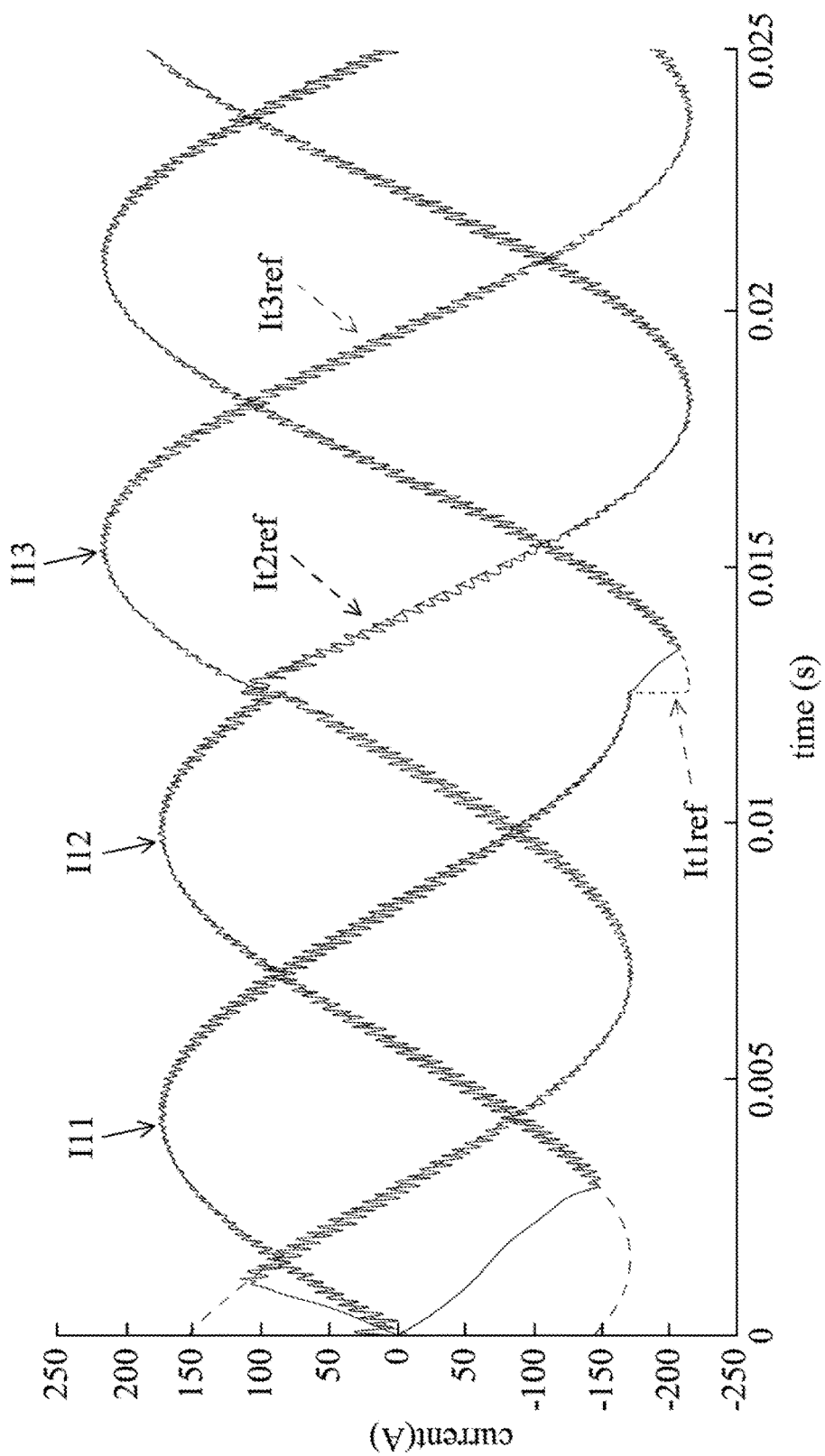
FIG. 10 is a schematic chart showing the relationship between a current and time of a conventional power converting device containing single low frequency inverter.

Please refer to FIG. 8, FIG. 9 and FIG. 10. FIG. 8 is a further schematic chart showing the relationship between a current and time of the power converting device 100a of FIG. 4. FIG. 9 is yet another schematic chart showing the relationship between a current and time of the power converting device 100a of FIG. 4. FIG. 10 is a schematic chart showing the relationship between a current and time of a conventional power converting device containing single low frequency inverter. As shown in FIG. 10, the settling time of the conventional power converting device is slow because no high frequency inverting module 300a is used to compensate the low frequency inverting module 200a. For the power converting device 100a, as shown in FIG. 8, the second R-phase current I21, the second S-phase current I22 and the second T-phase current I23 of the high frequency inverting module 300a changes quickly when the load fluctuates, as a result, as show in FIG. 9, the dynamic response of the total output R-phase current It1, the total output S-phase current It2 and the total output T-phase current It3 will be better. That is, the total output R-phase current reference It1ref, the total output S-phase current reference It2ref and the total output T-phase current It3ref reference can be quickly achieved. Consequently, the settling time of the power converting device 100a is one eighth the settling time of the conventional power converting device.

Figure 11:
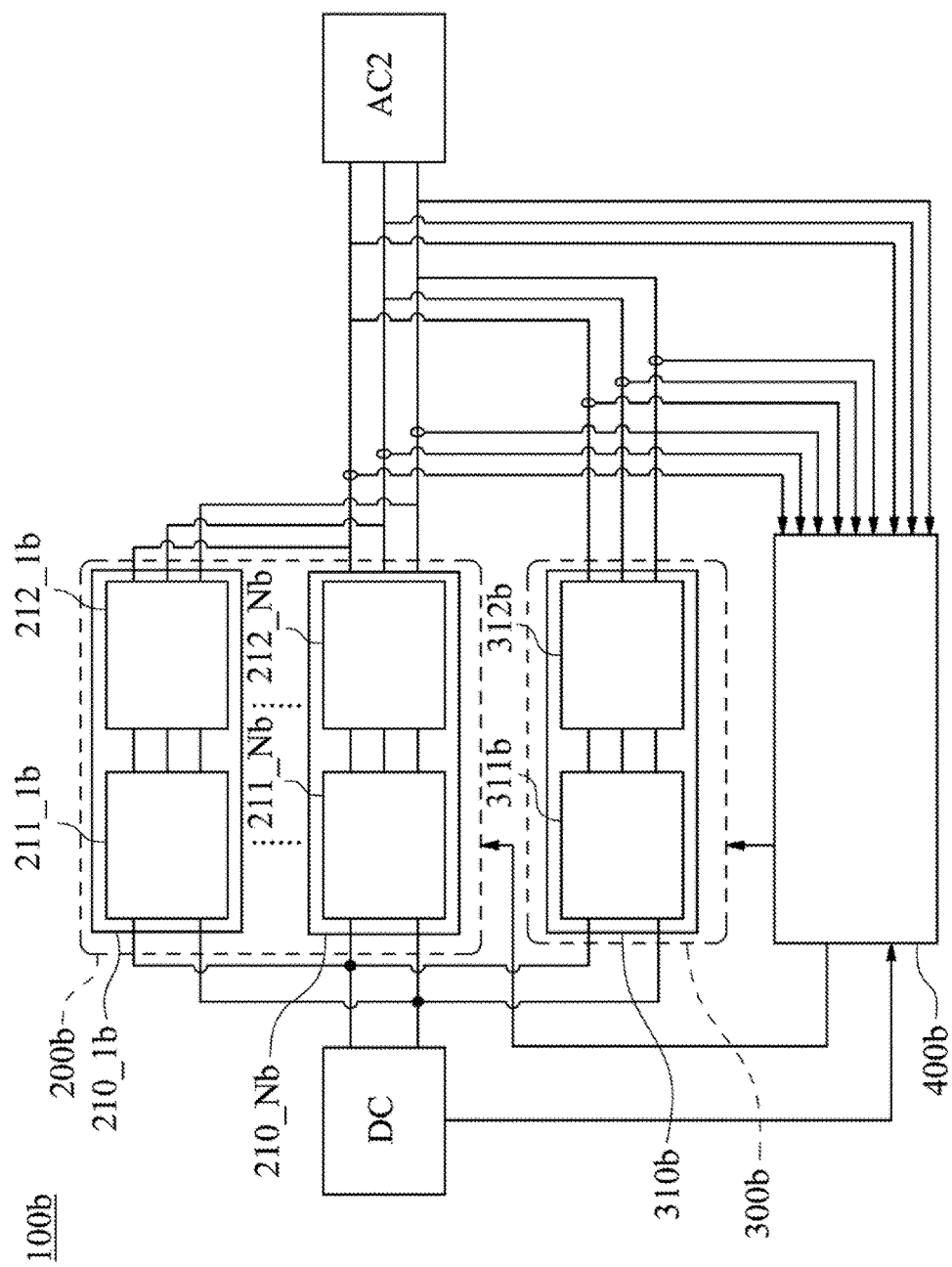
FIG. 11 is a schematic block diagram showing a power converting device containing high frequency inverter and low frequency inverter connecting in parallel according to a further embodiment of the present disclosure.

Please refer to FIG. 11. FIG. 11 is a schematic block diagram showing a power converting device 100b containing high frequency inverter and low frequency inverter connecting in parallel according to a further embodiment of the present disclosure. The structure of the power converting device 100b is similar to the structure of the power converting device 100a, but the low frequency inverting module 200b includes a plurality of low frequency inverting units 210_1b to 210_Nb connected in parallel. The low frequency inverting units 210_1b to 210_Nb include three-phase half-bridge inverters 211b_1b to 211_Nb and low frequency filters 212_1b to 212_Nb, respectively. The high frequency inverting module 300b includes a high frequency inverting unit 310b connected to the low frequency inverting module 200b in parallel. The high frequency inverting unit 310b includes another three-phase half-bridge inverter 311b and a high frequency filter 312b. Besides, the connecting relationship and the controlling method of the controlling module 400b is similar to that of the controlling module 400a. With the independent feedback of the first current and the second current, the ripple compensation and the dynamic response is quicker and more accurate, but the specification requirement of the digital-to-analog converter is higher and the converting time is longer due to too much feedbacks. The total output current feedback controlling structure can be adapted, which has less feedback parameters and lower specification requirement of the digital-to-analog converter, and the converting time will be shortened.

Figure 12:
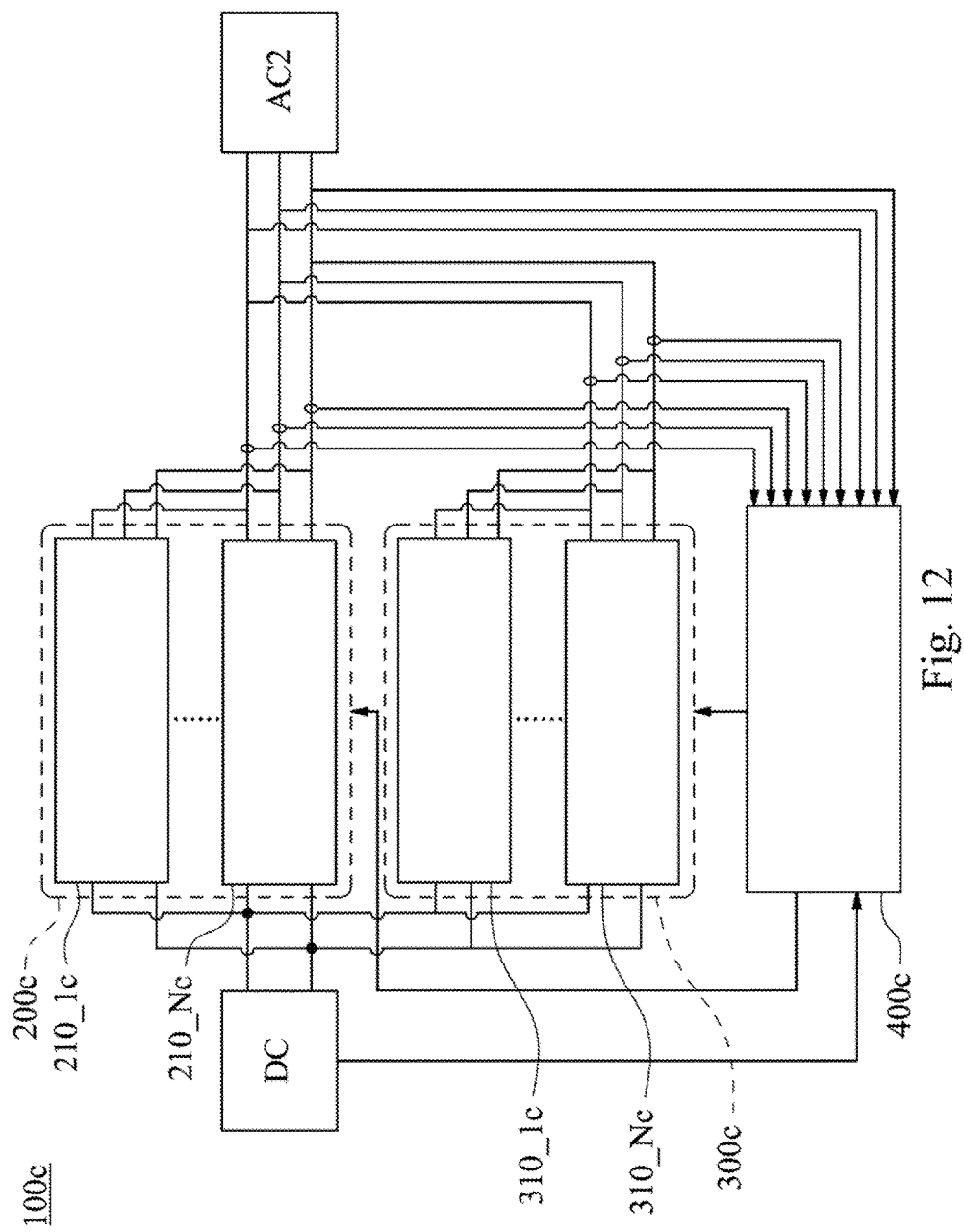
FIG. 12 is a schematic block diagram showing a power converting device containing high frequency inverter and low frequency inverter connecting in parallel according to yet another embodiment of the present disclosure.

Please refer to FIG. 12. FIG. 12 is a schematic block diagram showing a power converting device 100c containing high frequency inverter and low frequency inverter connecting in parallel according to yet another embodiment of the present disclosure. The structure of the power converting device 100c is similar to the structure of the power converting device 100a, but the low frequency inverting module 200c includes a plurality of low frequency inverting units 210_1c to 210_Nc connected in parallel, and the high frequency inverting module 300c includes a plurality of high frequency inverting units 310_1c to 310_Nc connected in parallel. Besides, the connecting relationship and the controlling method of the controlling module 400c is similar to that of the controlling module 400b and will not be described in detail.

Figure 13:
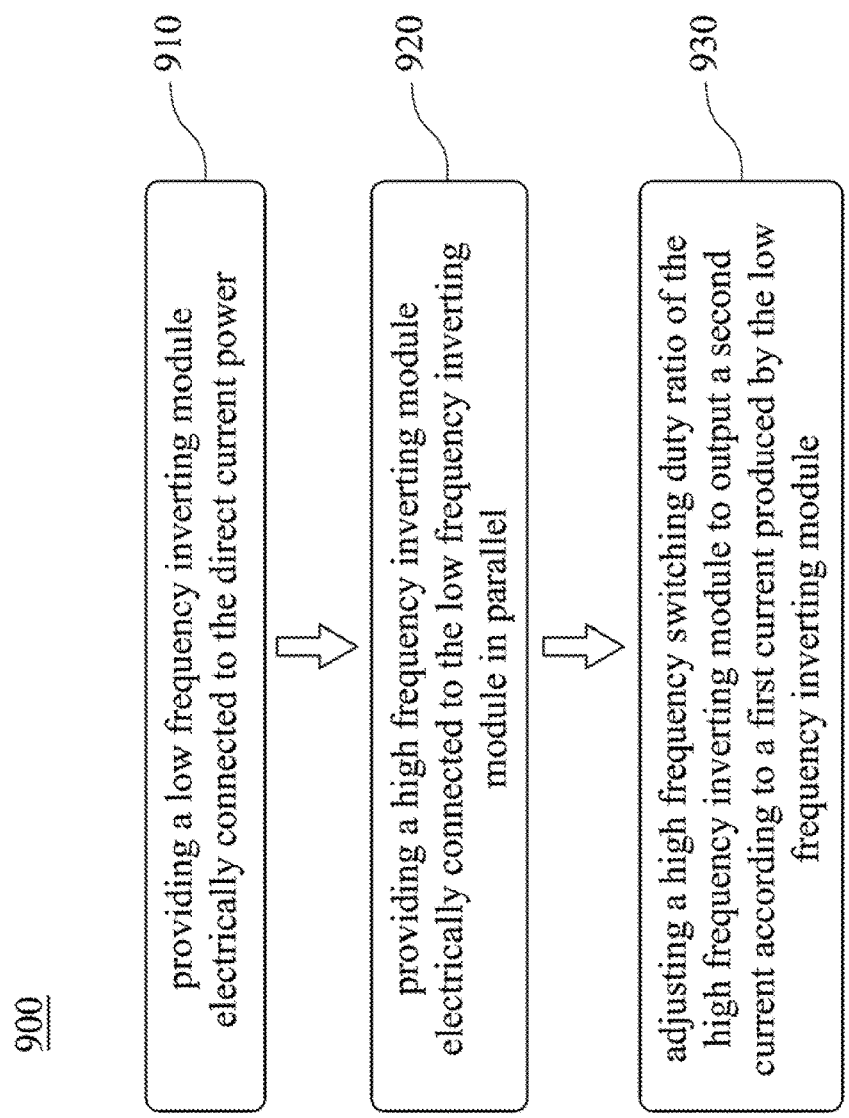
FIG. 13 is a flow chart showing a power converting method for high frequency inverter and low frequency inverter connecting in parallel according to one embodiment of the present disclosure.

Please refer to FIG. 13 and FIG. 1. FIG. 13 is a flow chart showing a power converting method 900 for high frequency inverter and low frequency inverter connecting in parallel according to one embodiment of the present disclosure. The power converting method 900 includes Steps 910, 920, 930.

In Step 910, the low frequency inverting module 200 is provided for connecting to the directive current power DC.

In Step 920, the high frequency inverting module 300 is provided for connecting to the low frequency inverting module 200 in parallel. The phrase "in parallel" means the second input end In2 of the high frequency inverting module 300 is connected to the first input end In1 of the low frequency inverting module 200, and the second output end O2 of the high frequency inverting module 300 is connected to the first output end O1 of the low frequency inverting module 200.

In Step 930, the high frequency switching duty ratio of the high frequency inverting module 300 is adjusted to output the second current I2 according to the first current I1 produced by the low frequency inverting module 200. The second current I2 is for compensating the ripples of the first current I1.

The power converting method 900 further includes providing a controlling module 400 which is electrically connected to the low frequency inverting module 200 and the high frequency inverting module 300. The high frequency switching duty ratio is adjusted by the controlling module 400 according to the first current I1, the second current I2 and the voltage of the directive current power AC. Or the low frequency switching duty ratio is adjusted by the controlling module 400 according to the first current I1 and the voltage of the directive current power AC. The detail controlling method of the controlling module 400 is similar to the description of FIGS. 4 and 5, but the final output current is a single-phase current. In other embodiment, after receiving the feedback signal, such as the first current I1, the second current I2 or the voltage of the alternating current power AC, other controlling method can be adapted by the controlling module 400 to adjusting the high frequency switching duty ratio or the low frequency switching duty ratio.

Figure 14:
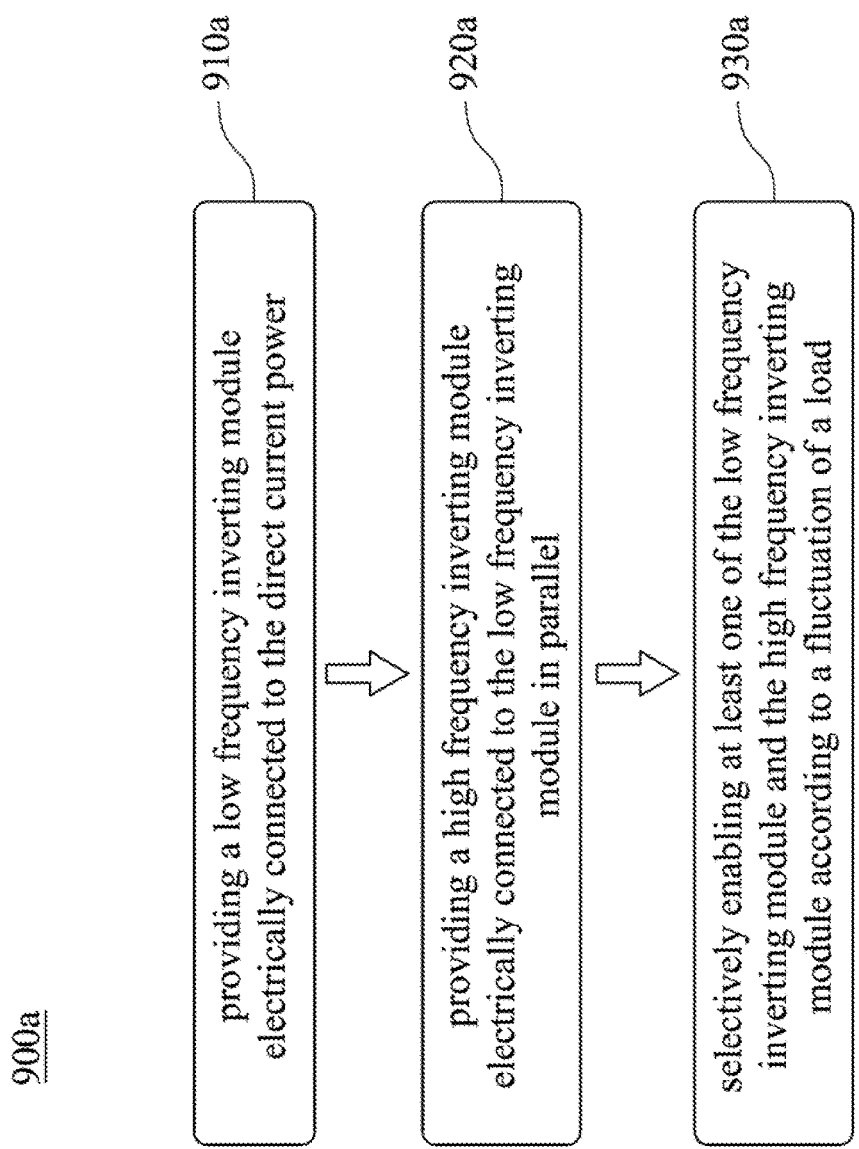
FIG. 14 is a flow chart showing a power converting method for high frequency inverter and low frequency inverter connecting in parallel according to another embodiment of the present disclosure.

Please refer to FIG. 14 and FIG. 1. FIG. 14 is a flow chart showing a power converting method 900a for high frequency inverter and low frequency inverter connecting in parallel according to another embodiment of the present disclosure. The power converting method 900a includes Steps 910a, 920a, 930a. Steps 910a, 920a are similar with Steps 910, 920, respectively. But in Step 930a, at least one of the low frequency inverting module 200 and the high frequency inverting module 300 is selectively enabled according to a load fluctuation. When the high frequency inverting module 300 and the low frequency inverter 200 is both enabled, the high frequency inverting module 300 outputs a second current I2 according to the first current I1 generated by the low frequency inverting module 200. The second current I2 is used to compensate the ripples of the first current I1.

Figure 15:
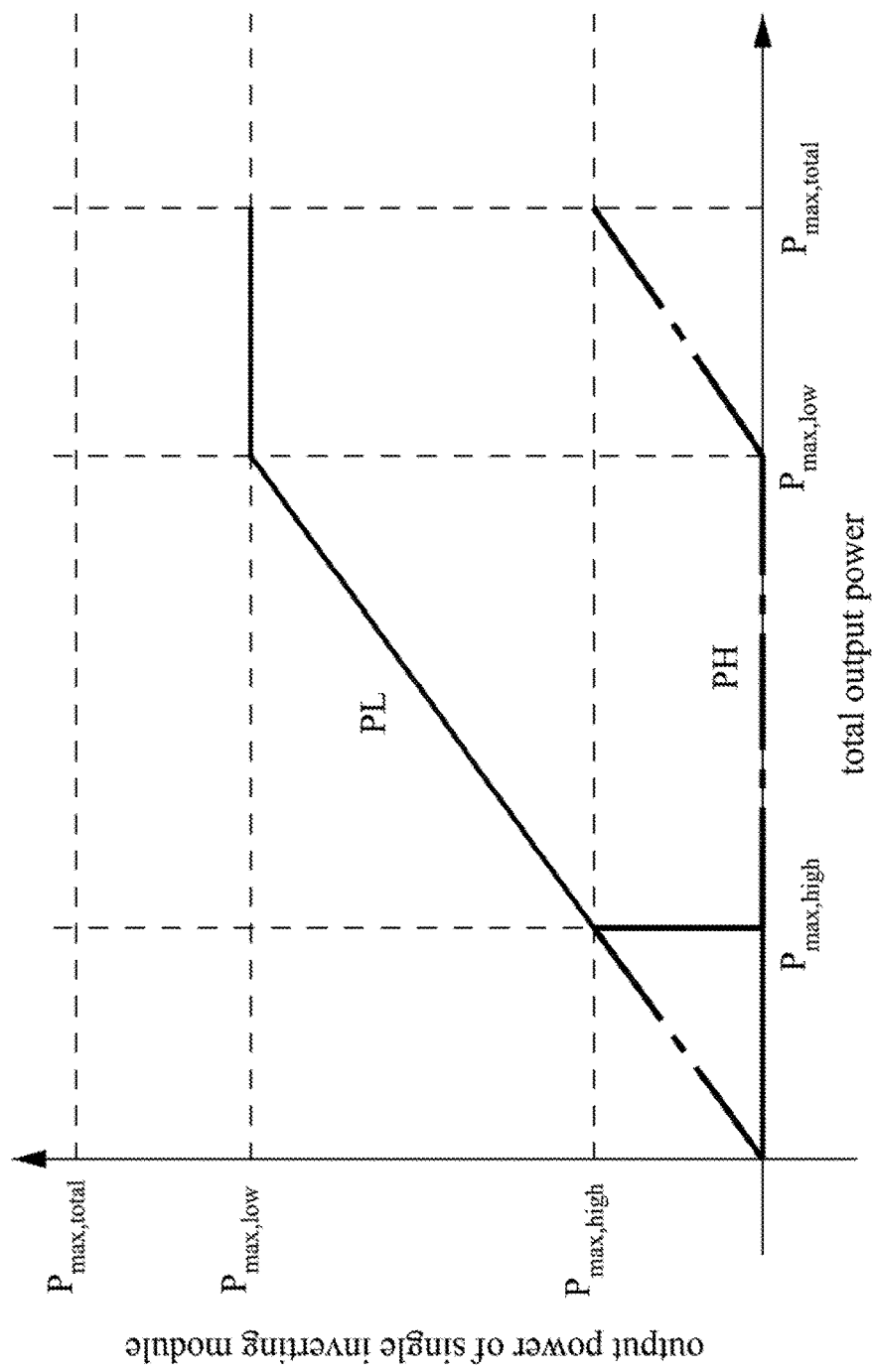
FIG. 15 is a schematic chart showing the power dispatch of the power converting method of FIG. 14.

Please refer to FIG. 15. FIG. 15 is a schematic chart showing the power dispatch of the power converting method 900a of FIG. 14. PL presents the power of the low frequency inverting module 200. PH presents the high frequency inverting module 300. $P_{max,total}$ presents the rated power of the power converting device 100. When the load is light, only the high frequency inverting module 300 is enabled. The power PH of the high frequency inverting module 300 is not zero and the power PL of the low frequency inverting module 200 is zero. When the load is fluctuating and exceeds the rated load $P_{max,high}$ of the high frequency inverting module 300, the low frequency inverting module 200 will be enabled. The power PL of the low frequency inverting module 200 is not zero, and the low frequency inverting module 200 is responsible for the main output. The current reference of the high frequency inverting module 300 is zero and the high frequency inverting module 300 is responsible for the ripple elimination and the load fluctuating compensation. When the load is fluctuating and exceeds the rated load $P_{max,low}$ of the low frequency inverting module 200, the high frequency inverting module 300 will be enabled and the current reference of the high frequency inverting module 300 is not zero. Because only high frequency inverting module 300 is enabled when the load is light, the load of the high frequency inverting module 300 is increased, and the controlling difficulty is decreased. The loss occurred by operation of multi-module during light load can be decreased and the dynamic response can be increased.

Figure 16:
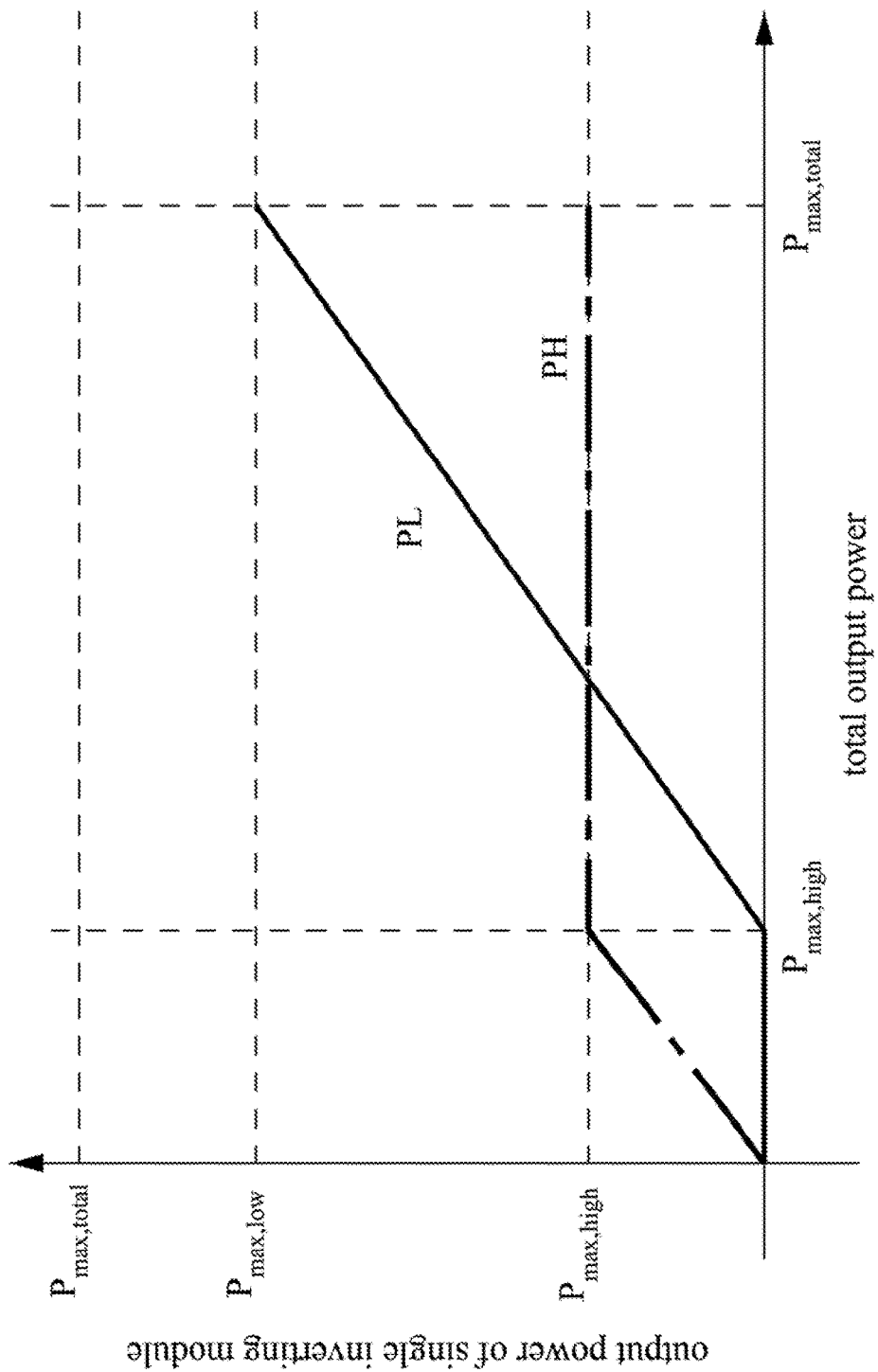
FIG. 16 is another schematic chart showing the power dispatch of the power converting method of FIG. 14.

Please refer to FIG. 16. FIG. 16 is another schematic chart showing the power dispatch of the power converting method 900a of FIG. 14. When the load is light, only the high frequency inverting module 300 is enabled. When the load is fluctuating and exceeds the rated load $P_{max,high}$ of the high frequency inverting module 300, the low frequency inverting module 200 and the high frequency inverting module 300 are both enabled. The power PL of the high frequency inverting module 300 is fixed and the current reference of the high frequency inverting module 300 is not zero. When the power converting device quickly unloads, this kind of power dispatch has good efficiency for dynamic response.

Figure 17:
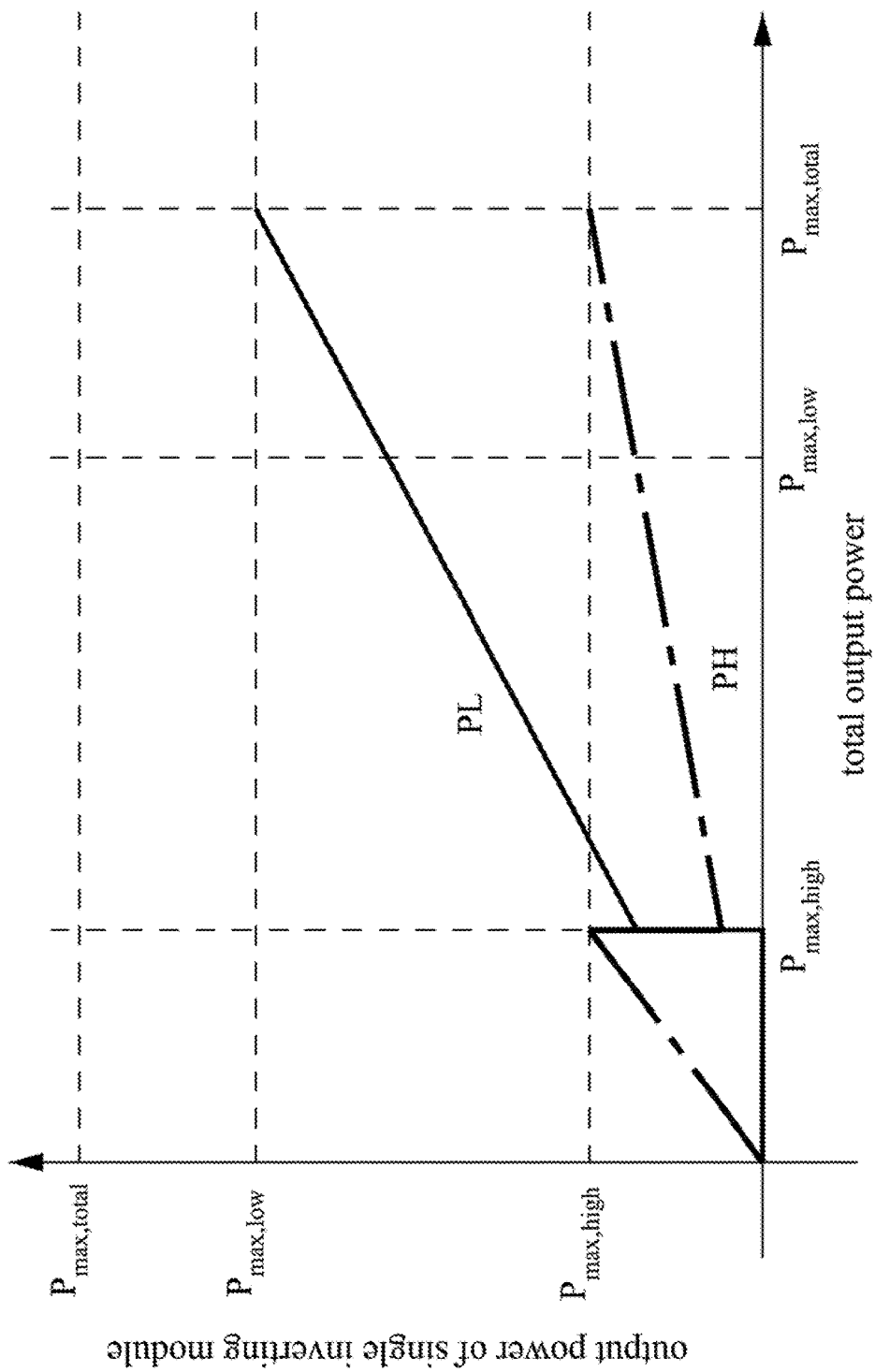
FIG. 17 is a further schematic chart showing the power dispatch of the power converting method of FIG. 14.

Please refer to FIG. 17. FIG. 17 is a further schematic chart showing the power dispatch of the power converting method 900a of FIG. 14. When the load is fluctuating and exceeds the rated load $P_{max,high}$ of the high frequency inverting module 300, the low frequency inverting module 200 and the high frequency inverting module 300 are both enabled. The power PL of the high frequency inverting module 300 is scaling and the current reference of the high frequency inverting module 300 is not zero. Light load operation of any one of the inverting modules can be prevented in this kind of power dispatch.

The power can be controlled by setting the current reference of the high frequency inverting module or the low frequency inverting module. Taken power converting device 100a, as shown in FIG. 4, as an example, when the load is increased immediately, the three-phase current reference of the low frequency inverting module 200a or the high frequency inverting module 300a can be increased. On the other hand, when the load is decreased immediately, the three-phase current reference of the low frequency inverting module 200a or the high frequency inverting module 300a can be decreased. If the high frequency inverting module 300a needs to output more power, the three-phase current reference of the high frequency inverting module 300a should be increased. Similarly, if the low frequency inverting module 200a needs to output more power, the three-phase current reference of the low frequency inverting module 200a should be increased.

The rated total power can be auto changed through measurement or through manual modification. The distribution of the power of the high frequency inverting module or the low frequency inverting module can be decided according to the power dispatch shown in FIGS. 15 to 17. Finally, the controlling module will adjust the current reference according to the distribution of the power.

As it can be seen from the above mentioned embodiments, the present disclosure has the following advantages.

1. With the ripple compensation and the dynamic compensation, the requirement of the inductor of the filter of the low frequency inverting module is decreased. And the ripple will not increase owing to the declining inductance caused by the increasing current.

2. High-speed switching elements which has low power and low cost are used in the high frequency inverting module. As a result, the inductance of the filter is small owing to the high switching frequency. Hence, the high-power elements can be replaced.

3. With the high switching frequency and the high current fluctuation of the high frequency inverting module, the settling time of the fluctuating load can be shortened. The dynamic response of the power converting device can be improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A power converting method for high frequency inverter and low frequency inverter connecting in parallel, which is for converting a direct current power into an alternating current power, comprising:

providing a low frequency inverting module, the low frequency inverting module comprising a first input end and a first output end, the first input end electrically connected to the direct current power;

providing a high frequency inverting module electrically connected to the low frequency inverting module in parallel, the high frequency inverting module comprising a second input end and a second output end, the second input end electrically connected to the first input end, the second output end electrically connected to the first output end; and adjusting a high frequency switching duty ratio of the high frequency inverting module to output a second current according to a first current produced by the low frequency inverting module;

wherein the second current is for compensating ripples of the first current.

2. The power converting method of claim 1, wherein the low frequency inverting module comprises a plurality of low frequency inverting units connected in parallel.

3. The power converting method of claim 2, wherein the high frequency inverting module comprises a plurality of high frequency inverting units, and each high frequency inverting unit is connected to the low frequency inverting module in parallel.

4. The power converting method of claim 1, further comprising:

providing a controlling module electrically connected to the low frequency inverting module and the high frequency inverting module;

wherein the controlling module is for adjusting the high switching duty ratio according to the first current, the second current and a voltage of the alternating current power.

5. The power converting method of claim 1, further comprising:

providing a controlling module electrically connected to the low frequency inverting module and the high frequency inverting module;

wherein the controlling module is for adjusting a low switching duty ratio of the low frequency inverting module according to the first current and a voltage of the alternating current power.

6. A power converting device containing high frequency inverter and low frequency inverter connecting in parallel, which is applied to the power converting method of claim 1, comprising:

the low frequency inverting module, comprising:
the first input end electrically connected to the direct current power; and
the first output end for outputting a first current;

the high frequency inverting module, comprising:
the second input end electrically connected to the first input end; and
the second output end electrically connected to the first output end and being for outputting a second current; and a controlling module electrically connected to the low frequency inverting module and the high frequency inverting module, the controlling module being for adjusting the high switching duty ratio to allow the second current to compensate the ripples of the first current.

7. The power converting device of claim 6, wherein the low frequency inverting module comprises a plurality of low frequency inverting units connected in parallel.

8. The power converting device of claim 6, wherein the high frequency inverting module comprises a plurality of high frequency inverting units connected in parallel.

9. The power converting device of claim 6, wherein the low frequency inverter comprises a low frequency inverting unit which comprises a three-phase half-bridge inverter operating in a low switching frequency, and the high frequency inverting module comprises a high frequency inverting unit which comprises another three-phase half-bridge inverter operating in a high switching frequency.

10. The power converting device of claim 9, wherein the low switching frequency is eight times the high switching frequency.

11. The power converting device of claim 6, wherein a highest power of the low frequency inverting module is larger than a highest power of the high frequency inverting module.

12. A power converting method for high frequency inverter and low frequency inverter connecting in parallel, which is for converting a direct current power into an alternating current power, comprising:

providing a low frequency inverting module, the low frequency inverting module comprising a first input end and a first output end, the first input end electrically connected to the direct current power;

providing a high frequency inverting module electrically connected to the low frequency inverting module in parallel, the high frequency inverting module comprising a second input end and a second output end, the second input end electrically connected to the first input end, the second output end electrically connected to the first output end; and selectively enabling at least one of the low frequency inverting module and the high frequency inverting module according to a fluctuation of a load;

wherein when the high frequency inverting module and the low frequency inverting module are both enabled, the high frequency inverting module outputs a second current according to a first current produced by the low frequency inverting module, and the second current is for compensating ripples of the first current.

13. The power converting method of claim 12, further comprising:

providing a controlling module electrically connected to the low frequency inverting module and the high frequency inverting module;

wherein the controlling module is for adjusting a high switching duty ratio of the high frequency inverting module according to the first current, the second current and a voltage of the alternating current power.

* * * * *